United States Patent [19]
Zmola et al.

[11] 3,861,999
[45] Jan. 21, 1975

[54] NUCLEAR REACTOR ARRANGEMENT AND METHOD OF OPERATING SAFE EFFECTIVE TO INCREASE THE THERMAL AMARGIN IN HIGH POWER DENSITY REGIONS

[75] Inventors: Paul C. Zmola; Royce J. Rickert, both of Bloomfield, Conn.

[73] Assignee: Combustion Engineering, Inc., Windsor, Conn.

[22] Filed: Nov. 13, 1968

[21] Appl. No.: 775,558

Related U.S. Application Data
[63] Continuation of Ser. No. 630,986, April 14, 1967, abandoned.

[52] U.S. Cl............... 176/61, 176/43, 176/50, 176/78
[51] Int. Cl............................................ G21c 15/02
[58] Field of Search............. 176/61, 50, 78, 54–56, 176/42, 43

[56] References Cited
UNITED STATES PATENTS

| | | | |
|---|---|---|---|
| 3,070,537 | 12/1962 | Treshow | 176/61 X |
| 3,212,991 | 10/1965 | Brynsvold et al. | 176/78 |
| 3,281,326 | 10/1966 | Hargo | 176/78 X |
| 3,314,859 | 4/1967 | Antony | 176/50 |
| 3,346,459 | 10/1967 | Prince et al. | 176/61 X |
| 3,349,004 | 10/1967 | Lass et al. | 176/78 |
| 3,361,639 | 1/1968 | Ashcroft et al. | 176/78 X |
| 3,379,619 | 4/1968 | Andrews et al. | 176/61 X |

FOREIGN PATENTS OR APPLICATIONS
1,417,483  10/1965  France...................... 176/38

Primary Examiner—Harvey E. Behrend
Attorney, Agent, or Firm—Eldon H. Luther

[57] ABSTRACT

A nuclear reactor cooled by a moderating fluid and a method of operating such a reactor wherein a portion of the coolant directed through the reactor and over the fuel elements is conveyed in bypass relation with the first portion of the reactor core such that it maintains generally its initial or entering temperature. This bypassed portion is then introduced at spaced intervals into regions of high power density so as to decrease the enthalpy of the coolant at these regions and thereby improve the margin to burnout and, accordingly, improve the power generation capability of the reactor.

Flow management is obtained in an open core by regulating the bypassed portion of the coolant in a manner such that hotter core regions receive a greater proportion of the total flow than colder core regions thereby further improving the thermal margin and accordingly the power generating capability of the reactor.

1 Claim, 23 Drawing Figures

INVENTORS
PAUL C. ZMOLA
ROYCE J. RICKERT
BY Eldon H. Luther
ATTORNEY

INVENTORS
PAUL C. ZMOLA
ROYCE J. RICKERT
BY Eldon H. Luther
ATTORNEY

PATENTED JAN 21 1975 3,861,999
SHEET 05 OF 10
FIG_8
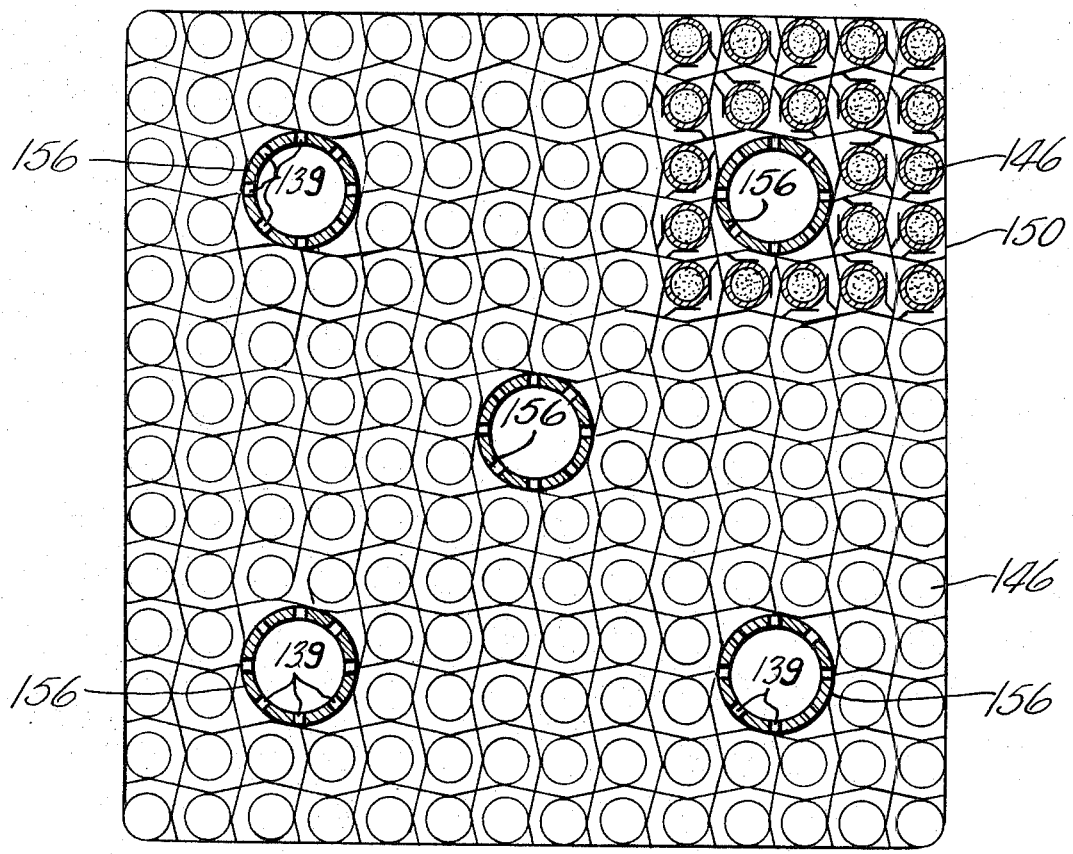
FIG_12
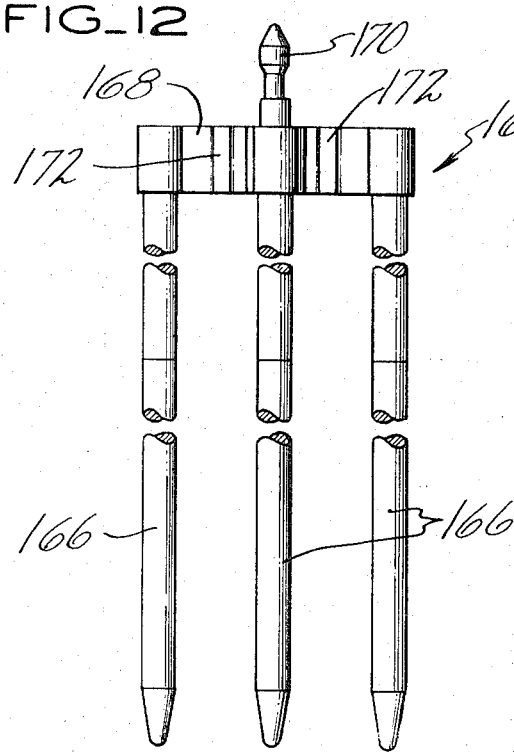
FIG_13
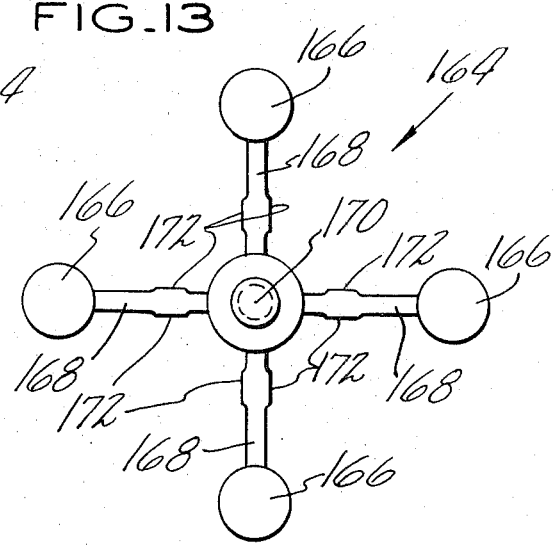
INVENTORS
PAUL C. ZMOLA
ROYCE J. RICKERT
BY Eldon H. Luther
ATTORNEY

INVENTORS
PAUL C. ZMOLA
ROYCE J. RICKERT

BY Eldon H. Luther
ATTORNEY

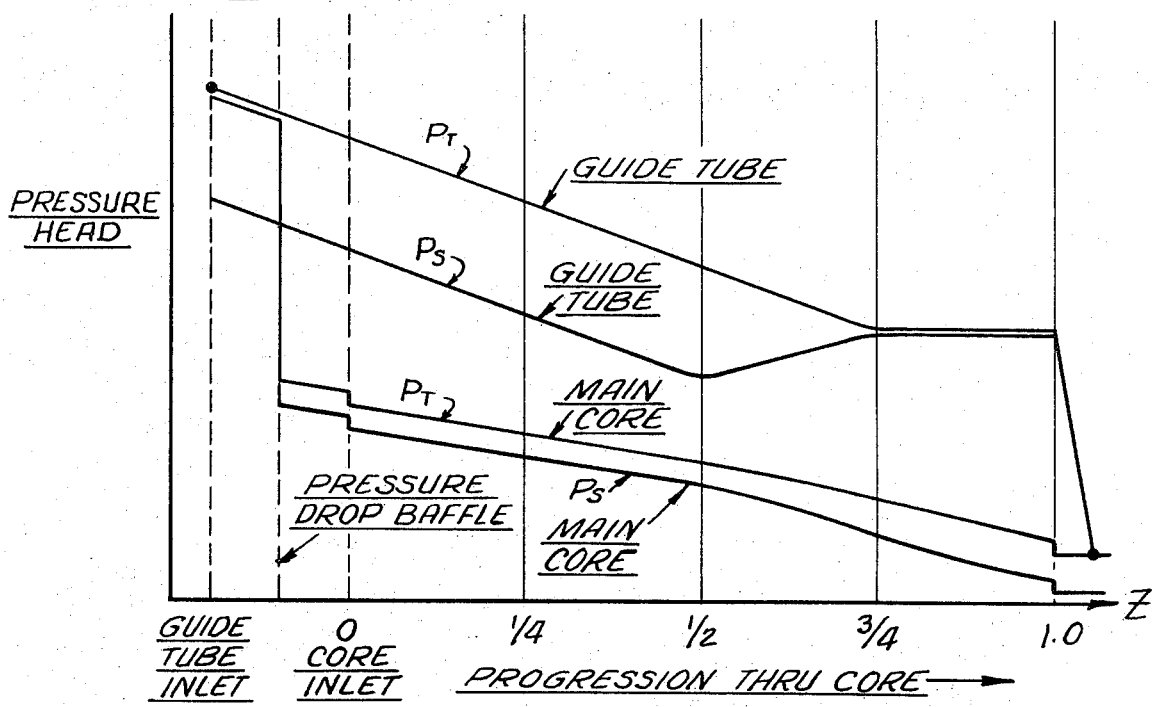
FIG._21
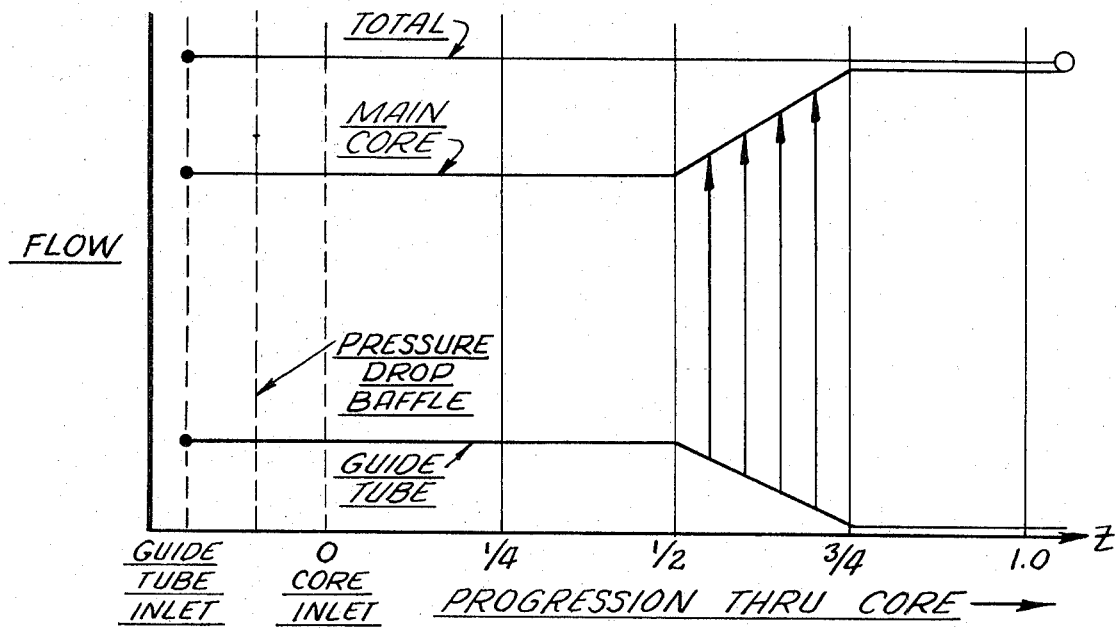
FIG._23

NUCLEAR REACTOR ARRANGEMENT AND METHOD OF OPERATING SAFE EFFECTIVE TO INCREASE THE THERMAL AMARGIN IN HIGH POWER DENSITY REGIONS

This application is a continuation of Ser. No. 630,986, filed April 14, 1967, now abandoned.

BACKGROUND OF THE INVENTION

Nuclear reactors that are moderated and cooled by a moderating fluid such as water have regions in the reactor core which have a higher power density, or more properly, have a higher rate of enthalpy rise than in other regions. This may come about for a number of reasons, one of which is the necessity for providing space within the core for the receipt of control rods. When these rods are withdrawn, there is left a void that is filled with moderator which increases the moderating capacity and thereby increases power generation in the adjacent fuel. These regions of high power density limit the power generation capability of the entire reactor in that it is in these regions that the margin to departure from nucleate boiling (DNB) or burnout, generally termed thermal margin, approaches the limiting value such that further power output of the reactor cannot be obtained without possible damage to the reactor. Recognizing this situation, the present invention provides an organization and method whereby the enthalpy in these limiting regions can be reduced in an effective manner which permits the power generation capability of the reactor to be increased for a given core inlet temperature and gross flow rate.

Another problem with which the present invention is concerned is the uneven power distribution transversely of the entire reactor core. Generally speaking the fuel elements in the outer region of the core operate at a lower power output than the fuel elements at regions disposed inwardly of the outer core region. Furthermore, there may be particular regions within the core wherein the fuel elements operate at a higher power than other regions because of the way in which fuel is shuffled within the core or because of the enrichment of the fuel in the particular region or for some other reason. The result of this non-uniform power distribution is that the fuel elements in some regions operate at higher temperatures than those in others and, accordingly, it would be desirable if there could be a greater flow of coolant in the higher temperature regions than in the lower temperature regions. This result is accomplished with the present invention while still utilizing an open core, i.e., a core wherein the assemblies are not contained in individual boxes but rather wherein the sides of the assemblies are open permitting the free cross-flow of coolant from one assembly to the other.

SUMMARY OF THE INVENTION

In accordance with the invention there is provided a nuclear reactor cooled by a moderator and which comprises a core made up of numerous generally parallel fuel members disposed in side-by-side relation. The cooling water is directed through the core such as from the bottom of the core up through and out the top thereof. This water passes over the fuel elements thereby cooling the same with heat being imparted from the elements to this cooling water. The core has regions within it wherein the power is substantially greater than in other regions such that some of the flow channels for the cooling water have a substantially higher rate of enthalpy rise than other channels. Tubular members are provided in the core to direct cooling fluid from the core inlet region to regions of high rate of enthalpy rise located well into the core. By means of these tubular elements this cooling fluid effectively bypasses the initial portion of the core, for instance the lower region in a core having an upflow of cooling fluid and is introduced into the regions of high rate of enthalpy rise at a temperature substantially less than that of the fluid in these regions. This initial portion of the core is a region wherein the thermal margin is necessarily more than adequate and thus the bypassing of this portion of the cooling fluid can well be tolerated without causing any problem in connection with overheating or inadequate cooling. By thus inducing this cooler water into the channels of high enthalpy rise and at regions well within the reactor core where the enthalpy of the water is quite high, there is effected a reduction of the enthalpy in these channels thereby improving the thermal margin of these critical locations and accordingly improving the power generation capability of the entire reactor.

In addition to improving the thermal margin in these particular locations by reducing the enthalpy rise in the high power density regions, and, accordingly, regions of rate of high enthalpy rise, a gross flow management is provided to improve the thermal margin throughout the area of the reactor core. This is effected by orificing the tubular members which convey the cooling water in bypass relation with the initial core portion with this orificing being such as to provide a greater flow in the general region of the core wherein the fuel elements operate at high power output or in the high temperature regions of the core than in the low temperature or low power output regions of the core. Therefore, with the invention, the power generating capability of the reactor is increased both through the improvement of the localized thermal margins and through flow management of the gross coolant flow.

BRIEF DESCRIPTION OF THE DRAWINGS

FIG. 8 is a cross-sectional view of the assembly of FIG. 7 and is taken generally along line 8—8 of FIG. 7;

FIG. 12 is an elevational view of the control element assembly of this modified embodiment;

FIG. 13 is a top view of the control element assembly of FIG. 12;

FIGS. 21, 22 and 23 depict curves illustrating pressure, enthalpy and flow conditions respectively in the reactor generally from the inlet region of the core through the outlet region thereof.

DETAILED DESCRIPTION OF THE PREFERRED EMBODIMENT

Figure 1:
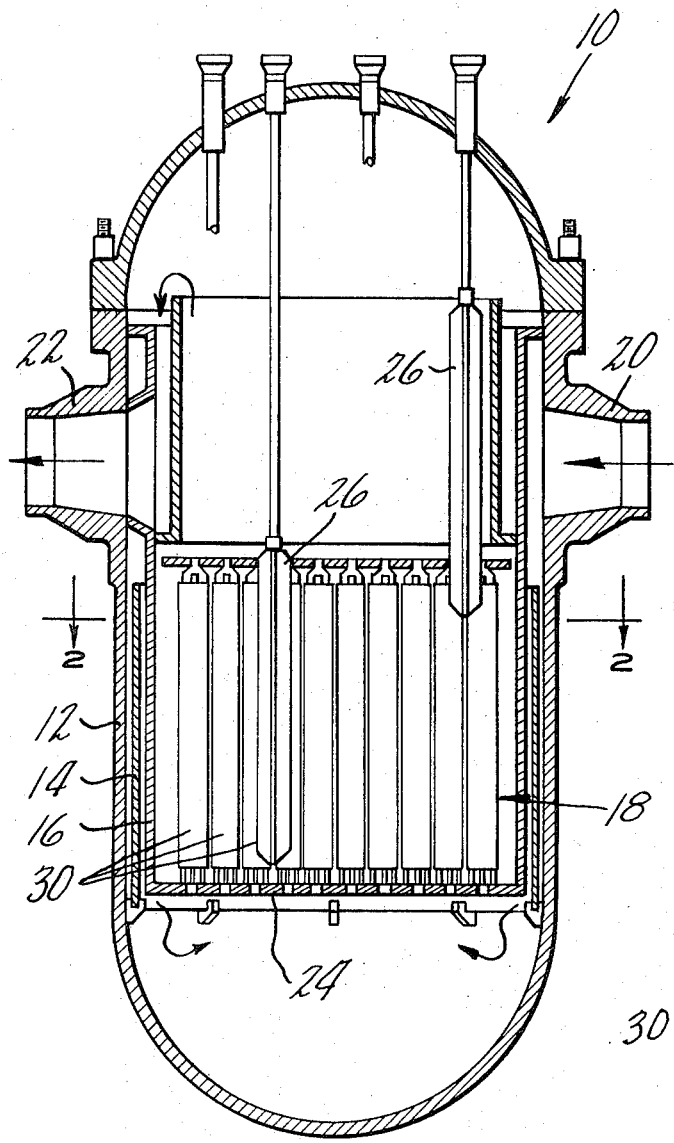
FIG. 1 is a vertical section through a water cooled and moderated nuclear reactor embodying the present invention. This figure is generally taken along line 1—1 of FIG. 2.

The preferred embodiments of the invention illustrated and described hereinafter are water cooled and moderated reactors and particularly pressurized water reactors. However, it will be understood that this is merely by way of illustration and explanation and that the invention is generally applicable to reactors employing a moderator-coolant, as for example, including boiling water and organic cooled reactors.

Referring now to the drawings, wherein like reference numerals are used throughout to designate like elements, the embodiment of the invention depicted in FIGS. 1-5 includes the water moderated and cooled nuclear reactor 10 housed within the vessel 12. Within this vessel there is provided a thermal shield 14 and a core support barrel 16. The core 18 of the reactor is located generally in the lower region of vessel 12, and the baffling within the vessel is such that the cooling water entering through nozzle 20 passes downwardly around barrel 16 and over shield 14 and then up through the core as indicated by the arrows to the upper region of the vessel and thence out through nozzle 22.

The core 18 rests upon the support plate 24 which is secured to the lower end of barrel 16. This core, in this illustrative embodiment, is made up of a relatively large number of fuel assemblies 30, each of which is comprised of parallel fuel members (also referred to as rods or tubes) maintained in spaced side-by-side relation such that the water passing from the lower region up through the core can pass over these fuel elements with heat generated in the elements being imparted to this water during operation of the reactor. Plate 24 is perforate in order to permit this upward flow of the cooling water and the reactor core is contained within a shroud or casing 31 which extends generally down into engagement with the plate 24 so that the water passing upwardly through this plate is confined to the region of the core and cannot bypass the core by traversing the space intermediate the shroud 31 and the support barrel 16.

In this illustrative embodiment reactivity within the core is controlled by vertically adjustable control rods 26 which have a cruciform in transverse configuration. The core is arranged to provide passageways 28 to receive these control rods with these passageways being provided between spaced fuel assemblies.

Figure 3:
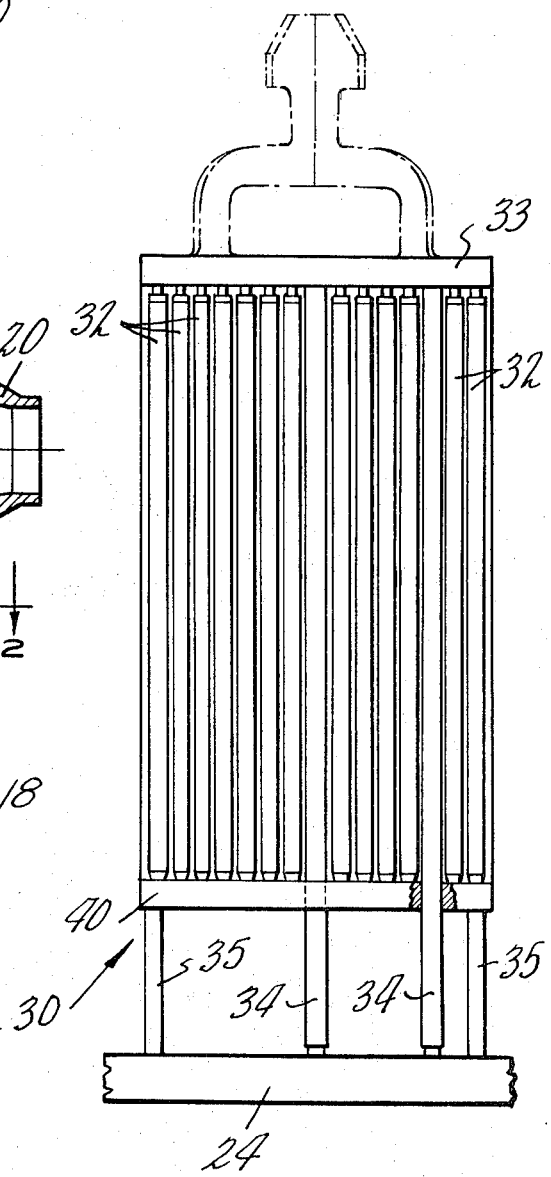
FIG. 3 is a vertical section of one fuel assembly of the reactor of the invention with this assembly being shown in association with the support plate of the reactor and with this view being taken generally along line 3—3 of FIG. 4.
Figure 2:
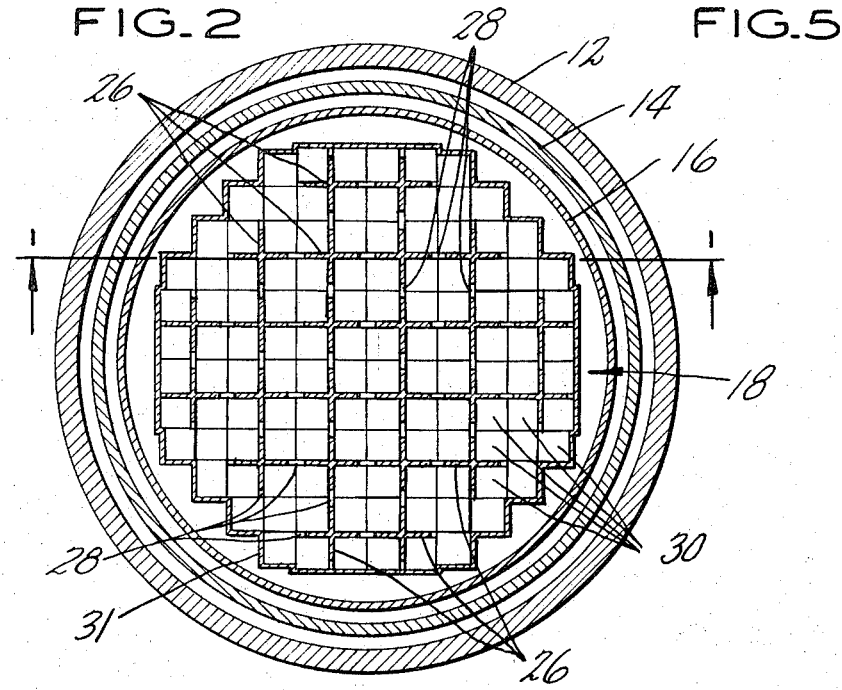
FIG. 2 is a transverse sectional view of the reactor of the invention, and is taken generally along line 2—2 of FIG. 1.
Figure 4:
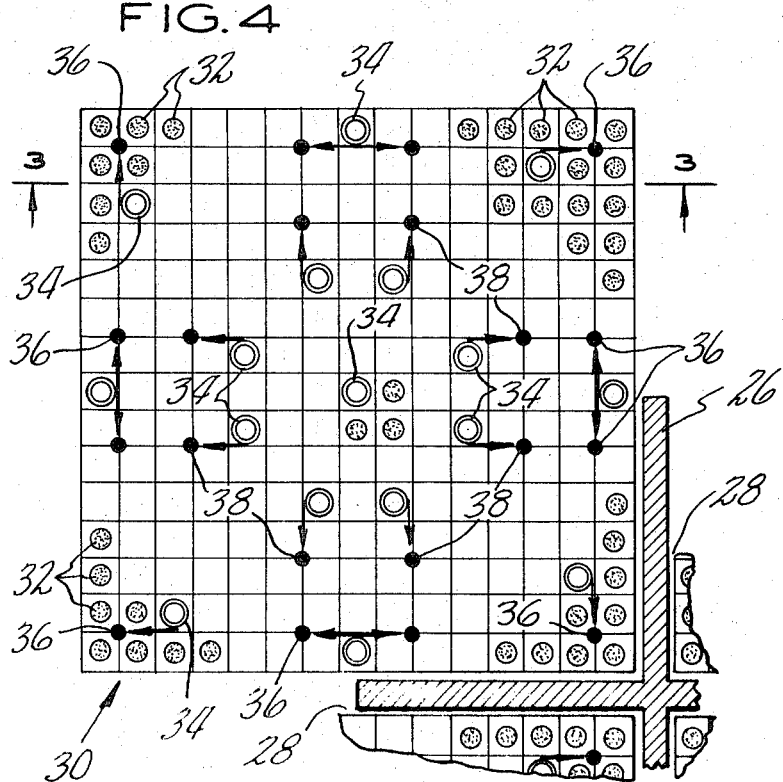
FIG. 4 is a transverse sectional view of the fuel assembly taken generally along line 4—4 of FIG. 3 and showing the disposition of the tubes for conveying cooling water to the high enthalpy rise channels.
Figure 5:
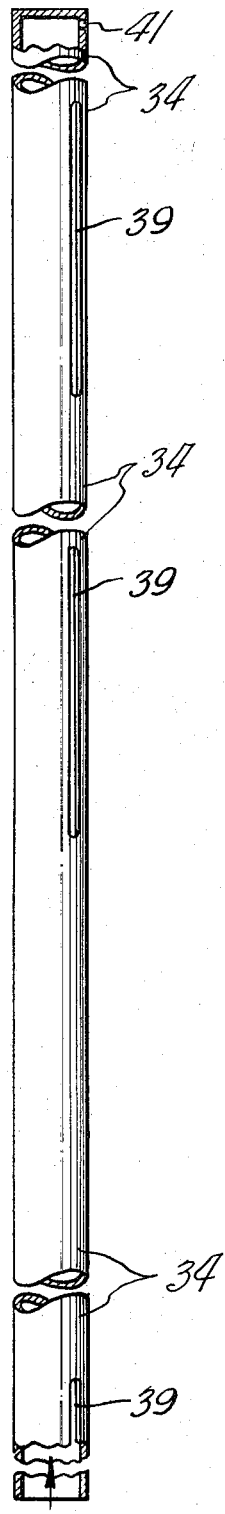
FIG. 5 is an elevational view, partially broken away, of one of the tubular members, per se, effective to direct the cool water to the high enthalpy rise channels.

The effect of the control rod passages 28 is to provide a high power density region at the portion of the fuel assemblies adjacent these passages during operation of the reactor. In order to improve the maximum to average power distribution transversely of the reactor core, there is provided in each of the assemblies which are adjacent a control rod passage several passageways which are free of fuel and which are filled with water during reactor operation. This can best be seen in FIGS. 3 and 4 wherein one such fuel assembly is shown in enlarged detail. The assembly is comprised of numerous fuel rods or members 32 which are preferably in the form of a tubular element such as zirconium, aluminum or stainless steel containing therewithin a nuclear fuel, i.e., a fissionable material. These fuel rods are retained between perforate end plates 33 and 40 forming part of the assembly with legs 35 extending down from plate 40 such that this plate is spaced from the support plate 24. Disposed among these fuel rods are the tubular members 34 which may be positioned in the manner shown and which are open at their lower end to receive water as it enters the reactor core and which are provided with a bleed opening at their upper end for the release of any entrapped gas. These tubular members 34 may, in effect, be a tube similar to those of fuel rod 32 without the fuel. It will be understood in the illustration of FIG. 4 that in each of the squares there shown wherein there is not provided a tubular member 34 there will be provided a fuel rod 32. For clarity of illustration all of the fuel rods 32 have not been shown, and the fuel rods 32 have been shown by a single circle while the tubular members 34 are shown by a double circle. The effect of distributing the tubular members 34 throughout the assembly in the manner shown in FIG. 4 is to provide additional regions transversely of the assembly wherein the power density is increased. The over-all effect produced by doing this is to improve the maximum to average power distribution throughout the transverse area of the reactor core.

The fuel rods 32 and the tubular members 34 are maintained in fixed spaced relation by means of end plates 33 and 34 and by means of suitable grids (such as disclosed in U.S. application Ser. No. 488,852 filed Sept. 21, 1965, by A. J. Anthony et al) with this spacing providing water channels for passage of water through the assembly and over the fuel rods. With this fuel assembly arrangement, the channels indicated by the dots 36 will be the channels of the highest power density and thus will be the channels which have the highest rate of enthalpy rise from bottom to top, i.e., in the direction of cooling water flow. In addition, the channels identified by the dots 38 will also have a higher power density than some other channels within the assembly because of the influence of the tubular members 34 positioned inwardly of the fuel assembly.

Figure 18:
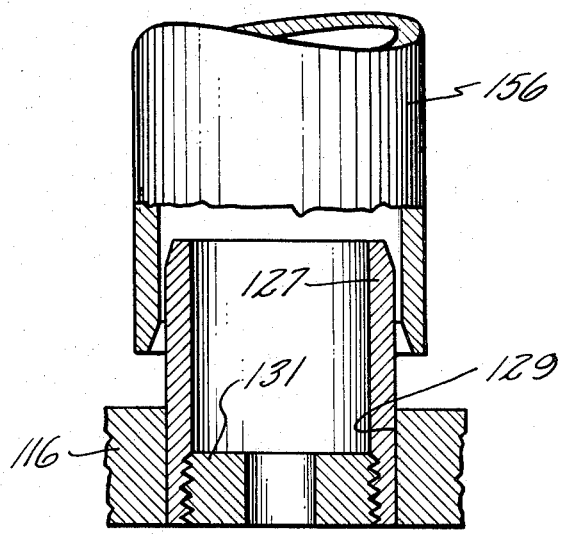
FIG. 18 is in the nature of a detailed vertical section through the lower end of the guide or flow tube and showing the disposition of this end with respect to the entrance conduit or nipple which contains the flow regulating orifice.

As previously mentioned, these regions of high power density limit the power generation capability of the reactor because it is in these regions that the thermal margin approaches its limiting value. In order to reduce the enthalpy of the fluid in the high enthalpy rise passageways, such as 36 and 38, there is provided, in accordance with the present invention, means for introducing relatively cool water into these passageways at a location well up within the reactor core. This is achieved by providing openings or slots 39 in the tubular members 34 to permit water to pass laterally from the tubes in a direction toward the high enthalpy rise passages as indicated by the arrows in FIG. 4. The tubes 34 communicate directly with the inlet side of support plate 24 via nipple 127 as shown in FIG. 18. Plate 24 is provided with holes for the passage of water through the plate and thence up through the reactor core, and these holes are sized to provide for a desired flow resistance, such as 3 to 15 pounds per square inch thereby assuring uniform flow distribution at the core inlet and providing for an additional pressure drop available to force the fluid through the lateral slots 39 in the tubes 34.

The initial slot in each of the tubes 34 is spaced well from the inlet of the tube such as 1/3 or half way up into the core of the reactor. The tubes 34 are capped at their upper end (with a bleed opening 41 provided) and the number and size of the slots may vary as desired; for example, in a core having fuel elements eight feet long there may be six vertically arranged slots each approximately 1 inch long by .03 inch wide with the slots being vertically spaced at 6 inch intervals. The orientation of the slots may be such as to direct the cool inlet water toward the hot channels to thereby reduce the enthalpy of these channels or they may be directed to induce lateral flow in the fuel cluster which would also reduce the enthalpy of the hot channels by promoting coolant mixing and cross flow within the assembly. The innermost or central tube 34 may be used for instrumentation or may be used as a flow tube provided with slots 39 as desired.

The amount of the enthalpy reduction in the high enthalpy rise channels will vary depending upon the core design and the relative disposition of the tubular members to the hot channels. Regardless of the particular design whereby cool water is introduced into the core at a region well displaced from the core inlet, there will be a reduction in enthalpy in the region of high power generation so long as the design is such as to produce agitation within this particular high power region since this agitation will promote a mixing of water in the high enthalpy rise channels with the water in the channels adjacent thereto which will, in turn, cause a lowering of the enthalpy. This mixing together with reduction in temperature by the introduction of this cool water will provide the desired reduction in enthalpy in these critical channels. It is, of course, of greatest advantage to direct the jets issuing from the tubes 34 toward the high enthalpy rise channels since this will effect the greatest enthalpy reduction and, accordingly, provide the greatest increase in the thermal margin. The cool fluid at the lower end of the reactor core which passes up through the tubes 34 bypasses the lower region of the core, i.e., it does not pass over the fuel elements in the lower region. However, this lower region has more than adequate thermal margin, and thus this bypassing effect of the fluid is not detrimental and does not cause cooling problems. While the fluid flowing through the tubes 34 will be heated to some extent because of transfer of heat through the tube wall from the fluid surrounding the tube, the temperature of the fluid that is jetted laterally into the core will be substantially lower than that of the surrounding fluid into which the jet is introduced.

It will be noted that in the organization depicted in FIG. 4 the jets directed from the tubes 34 are in a direction to cause a general cross-flow of the fuel assembly from the center of the assembly outward. This cross-flow enhances mixing within the fuel assembly tending to lower enthalpy of the fluid in the channels having high rate of enthalpy rise with the resulting improvement in power capability mentioned hereinbefore. Still further in this FIG. 4 arrangement the flow tubes 34 in the outer row of tubes can be so constructed as to operate as rubbing rails for the control rods 26. They additionally provide a cross-shaped water hole comparable to the one at the corner of the assembly when the control rod is removed. This provides an improved maximum to average power distribution transversely of the assembly and thus transversely of the core.

Referring now to the embodiment of FIGS. 6-16 there is shown therein an organization and method wherein the invention is of particular advantage and even greater advantage than in the cruciform control rod organization of the previously described embodiment. In the FIGS. 6-16 embodiment there is provided in lieu of cruciform control rods what may be termed finger control rods with the fingers being large in comparison to the fuel rods. The use of these finger control rods and the elimination of the cruciform control rods permits the fuel assemblies to be in juxtaposed relation thereby eliminating the large water gaps necessitated by the cruciform control rod construction. Each of the fuel assemblies in this modified arrangement contain a generally uniform and symmetrical array of guide tubes for receiving the control rods even though only a portion of the assemblies are provided with control rods. Each assembly is thus identical so that a satisfactory maximum-to-average power ratio is provided throughout the transverse area of the core and so that the assemblies are interchangeable. With the present invention these guide tubes also form the flow tubes to bypass the initial portion of the core with some of the cooling fluid as described in the previous embodiment. However, in this finger rod arrangement the location of increased power density due to moderator occupying the guide tubes in each of the assemblies is, in fact, the region disposed about the guide tube. Thus by utilizing this guide tube also as a flow tube and injecting water laterally outward therefrom into the core interior, a particularly effective arrangement for improving the thermal margin in the high power density and high enthalpy regions is obtained.

Figure 6:
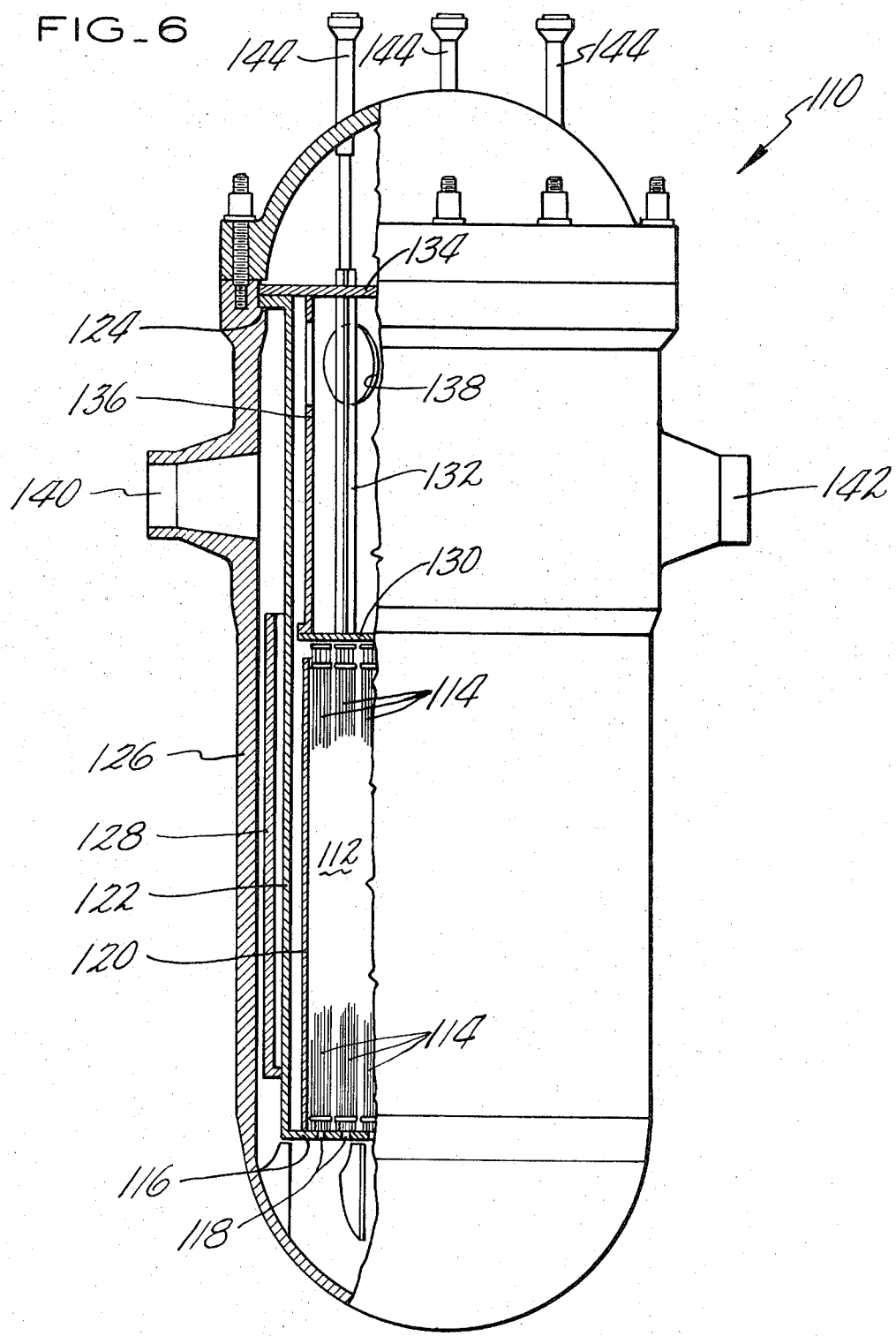
FIG. 6 is an elevational view of a reactor particularly in section showing a modified embodiment of the present invention.
Figure 7:
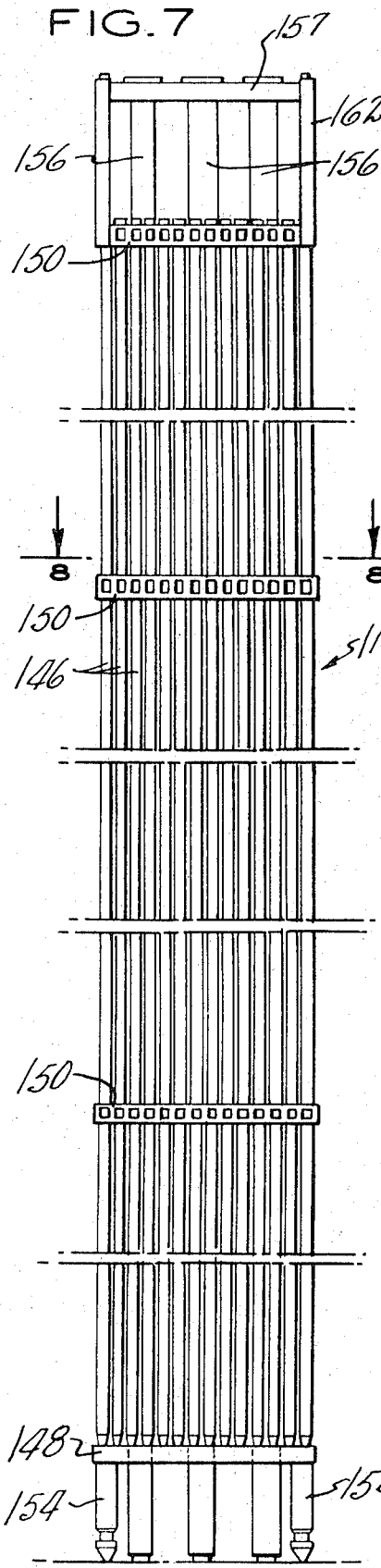
FIG. 7 is an elevational view of one of the fuel assemblies of this modified embodiment.

In this modified arrangement there is provided a reactor 110 including vessel 126, thermal shield 128, core support barrel 122 hung from lip 124, support plate 116 and shroud 120 disposed about the core 112. The flow of coolant is in through nozzle 140 down to the lower end of the vessel, up through holes 118 in plate 116 and then up through the reactor core and out nozzle 142. Mounted above the core is hold-down plate 130 which is supported from plate 134 by the skirt 136. This skirt 136 has holes 138 therein for coolant flow. The core 112 is comprised of a plurality of fuel assemblies 114 and provision is made for finger control rods to extend into selected ones of said assemblies. FIG. 6 illustrates the shrouding 132 for the control members and the nozzles 144 on which are mounted control driving devices.

Each of the fuel assemblies in the core is identical and may be of the construction depicted in FIGS. 7 through 11. These assemblies include a plurality of fuel rods 146 in side-by-side relation which are Zircaloy cladding tubes containing sintered $UO_2$ pellets or other fuel. There is disclosed in the arrangement of FIG. 8 a 14 × 14 arrangement, i.e., 14 rods on each side of the square assembly and in FIG. 17 a 12 × 12 arrangement. These rods are retained in their proper parallel relation by means of the lower end plate 148, the grid members 150 and an upper structure which includes upper end fitting member 157 and the corner pieces 162 which interconnect the corners of this fitting 157 with the upper grid member 150. Positioned within the assembly in the array shown in FIG. 3 are guide or flow tubes 156. These tubes are of such a size that they occupy the normal space taken up by four of the fuel rods 146. The guide tubes 156 extend up through fitting 157 and are connected thereto such as by a rolled fit and they also extend down through lower end plate 148. The interior of these tubes 156 communicates with the region in the vessel 110 located upstream of the support plate 116 with regard to coolant flow. This support plate is of a perforate nature having numerous openings 118 with these openings permitting fluid to pass up through the core of the reactor over the fuel rods 146 to withdraw heat from these rods. This plate produces a pressure drop as previously described in connection with the FIGS. 1–6 embodiment so as to make more effective the distribution of fluid by means of the tubes 156. The communication of tubes 156 upstream of support 116 is provided by means of the nipple 127 secured within opening 129 in plate 116 as shown in FIG. 18. This nipple has a chamfered upper end as shown, and the lower end of the tubes 156 is chamfered as shown to facilitate assembling. Threaded into the inlet of nipple 127 is a removable orifice 131 for the purpose hereinafter described. (Tubes 34 of the FIG. 1–6 embodiment preferably are provided at their inlet end with a similar nipple and orifice arrangement).

Figure 10:
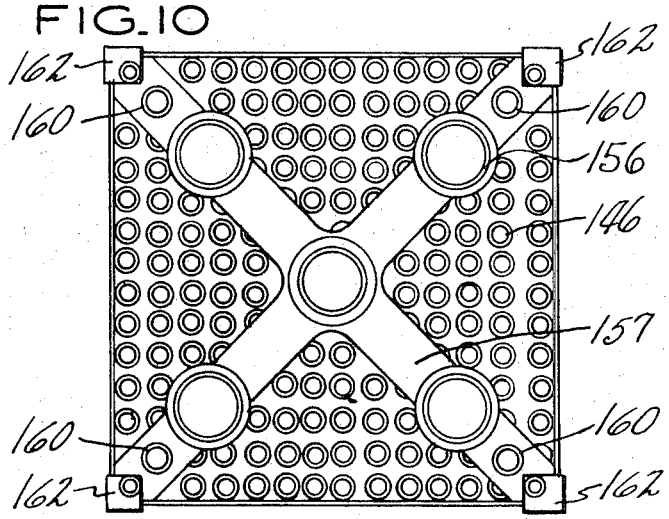
FIG. 10 is a top view of the assembly of FIG. 7.
Figure 9:
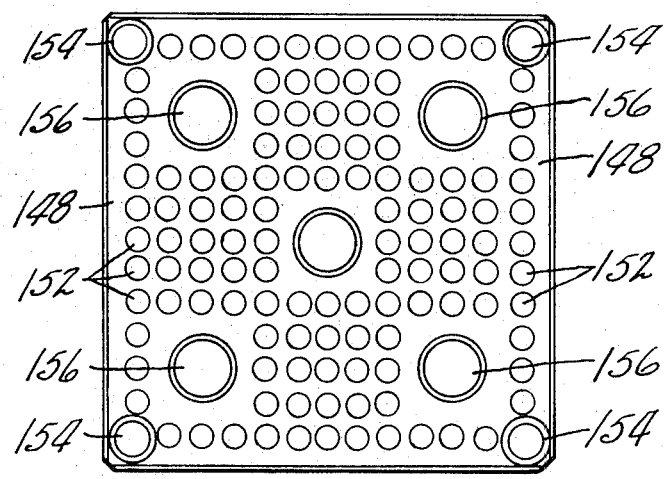
FIG. 9 is a bottom view of the assembly of FIG. 7.
Figure 11:
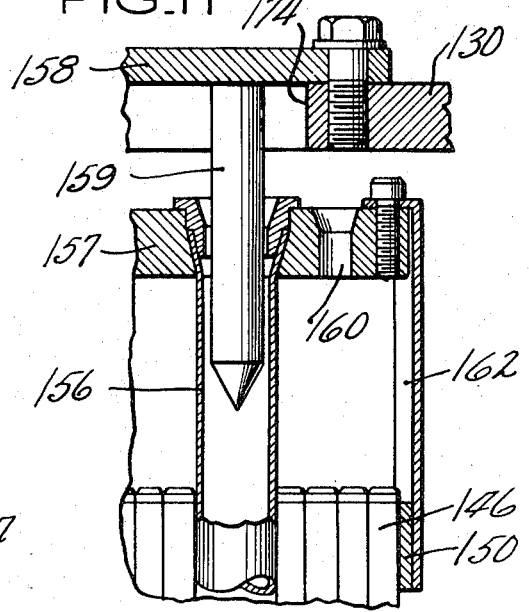
FIG. 11 is an enlarged vertical cross-sectional view of a corner of the uppermost portion of a fuel assembly of this modification with this view also illustrating flow restricting means.

A portion of the fuel assemblies within the reactor core, which may be in the nature of one-third of the total number of assemblies in the core, has control assemblies 164 mounted relative thereto. These control element assemblies each contain a plurality of finger type rods 166 as disclosed in FIG. 12. These rods are connected at their upper ends by a suitable spider 168 having a connector 170 for connection to a manipulator. These spiders are provided with bosses 172 to act as bearing surfaces during manipulation. The upper end fitting 157 at the upper end of the fuel assembly is cruciform, as shown in FIG. 10, while the lower end 148 is of the configuration shown in FIG. 9 having numerous openings 152 for the passage of fluid upwardly therethrough. The assemblies are supported on plate 116 by means of support pins 154 secured to this lower end plate 148.

The finger rods 166, which are never fully withdrawn from the core, are of a size with relation to the tubes 156 that they effectively block flow from the tubes allowing only a small flow past the finger rods for cooling. In order to effectively prevent any substantial flow from the upper ends of the tubes 156 which do not have associated therewith finger rods 166, there is provided a plate 158 secured to the hold-down plate 130 that is, in turn, secured to the lower end of skirt 136. This plate 158 has extending downwardly from it pins 159 that provide a relatively close fit within tube 156 such that only a small leakage flow passes between pin 159 and tube 156. Pins 159 serve as locating pins for the fuel assemblies without control rods and in the assemblies provided with control rods, locating pins 161 (FIG. 14) fitting in holes 160 serve this function. It will be noted that braces 162 extend downwardly from the end fitting 157 and connect at their lower ends with the uppermost fuel spacer grid as previously mentioned and the guide tubes 156 serve to tie the entire fuel assembly together.

Figure 14:
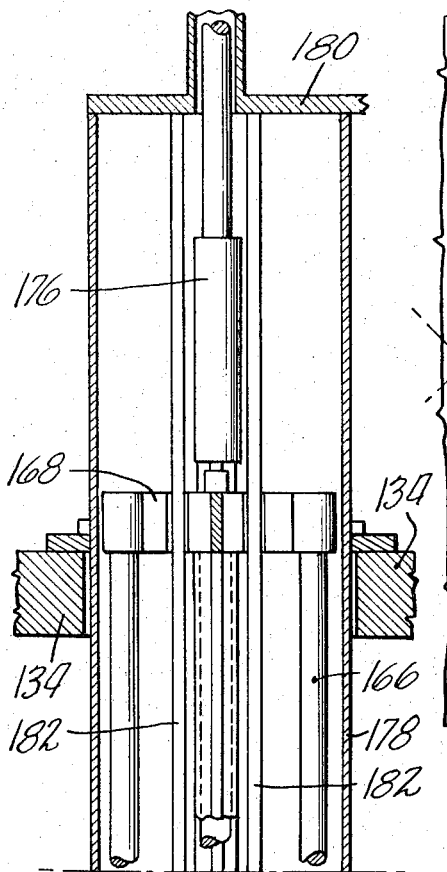
FIG. 14 is a vertical sectional view illustrating in this modified embodiment the arrangement of the control element assembly relative to the fuel assemblies and illustrating the upper control element assembly guide structure or shroud.
Figure 15:
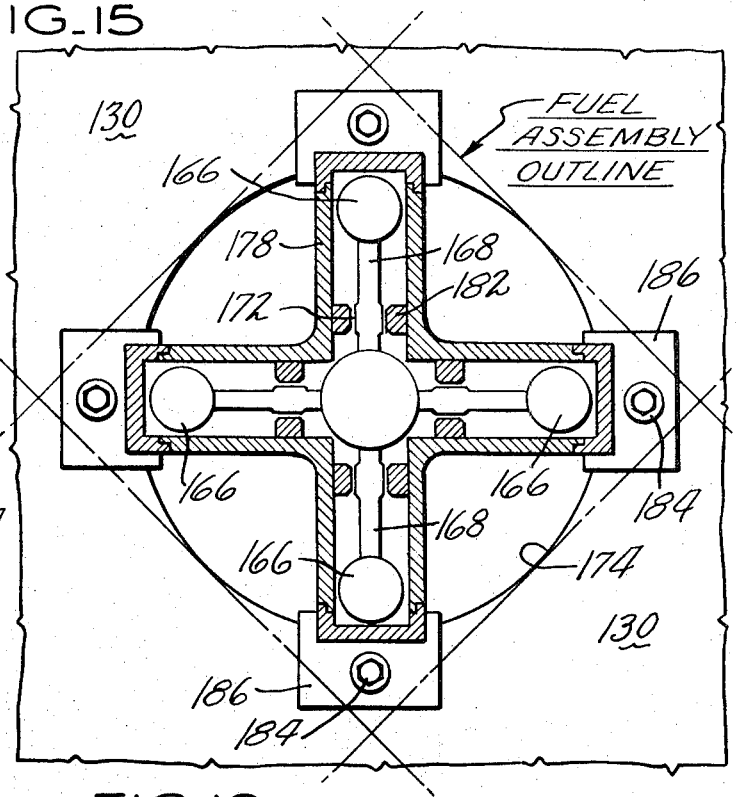
FIG. 15 is a horizontal cross-sectional view illustrating this control element assembly within the upper guide structure which is affixed to the hold-down plate.
Figure 16:
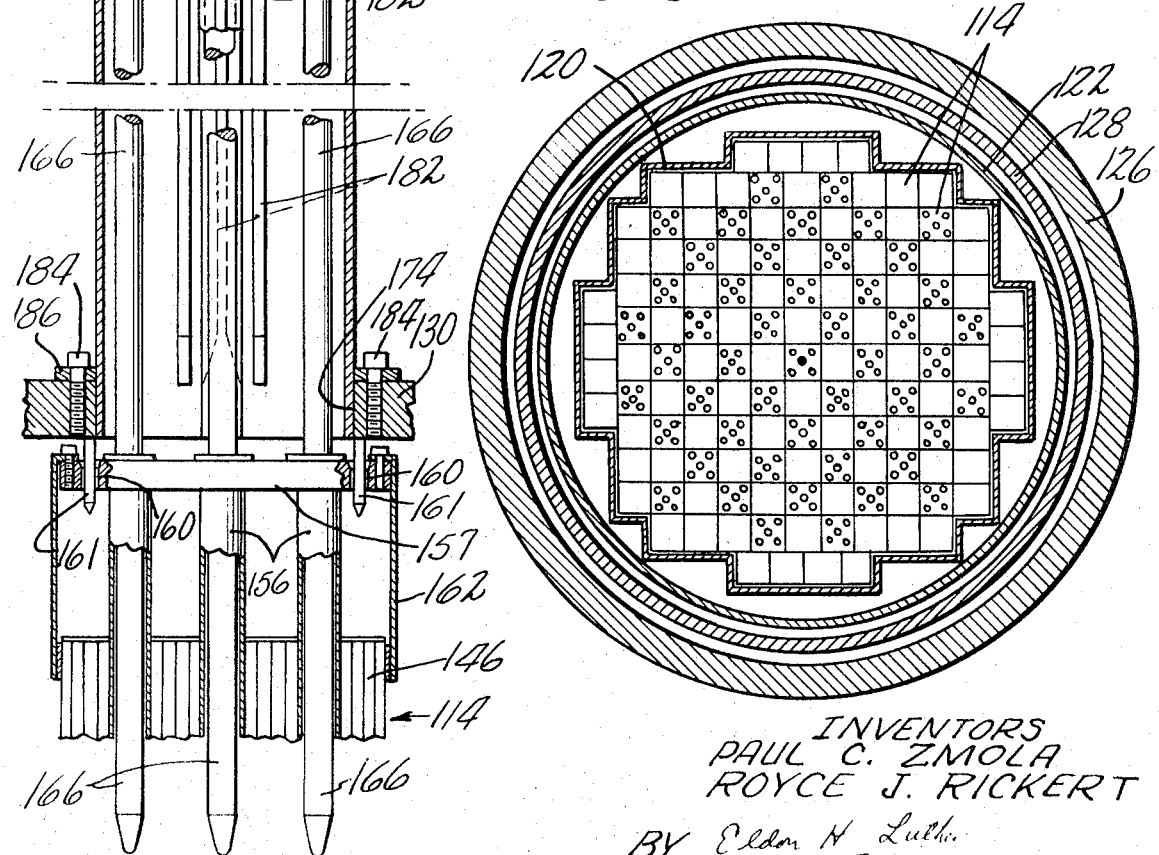
FIG. 16 is a cross-sectional view of this modified reactor embodiment showing the core geometry of the reactor.

When the control assembly is in its withdrawn position, it is contained within the cruciform shroud 178 that extends up from plate 130, and is provided at its upper end with cap 180 as shown in FIGS. 14 and 15. Located on the inner surface of the shroud 178 are guide or bearing strips 182 which bear against bosses 172 of spiders 168 during movement of the rod assembly. The shroud 178 is attached to the hold-down plate by means of bolts 184 and extensions 186.

Water coolant flows upwardly from the control assembly passing through the opening 174 in plate 130 and into the space surrounding the shrouds 178 and then through openings 138 and nozzle 142.

The tubes 156 provide within each of the assemblies and throughout the entire area of the core relatively large bodies of moderator such that a power peak is developed in the vicinity of these tubes. It is found, however, that by properly spacing these tubes 156 within the fuel assemblies and within the core arrangement the power distribution is entirely satisfactory and is considerably better than in a core utilizing cruciform control rods as in the FIG. 1–6 embodiment with the maximum-to-average power being considerably improved over that of the cruciform arrangement. However, there will be an increase in power density in the fuel elements adjacent the water holes or moderator holes produced by the tubes 156 and, accordingly, it will be in this region that coolant will be introduced in order to decrease the enthalpy. For this purpose the tubes 156 are provided with openings which may be generally in the region of 40 to 80 per cent of their length considering zero being at the bottom or inlet end of the tubes and 100 being at the outlet. These openings may be relatively small holes as 139 shown in FIG. 8 to project the cool water laterally in the region of high enthalpy rise and high power density thereby lowering the enthalpy and improving the thermal margin.

Figure 19:
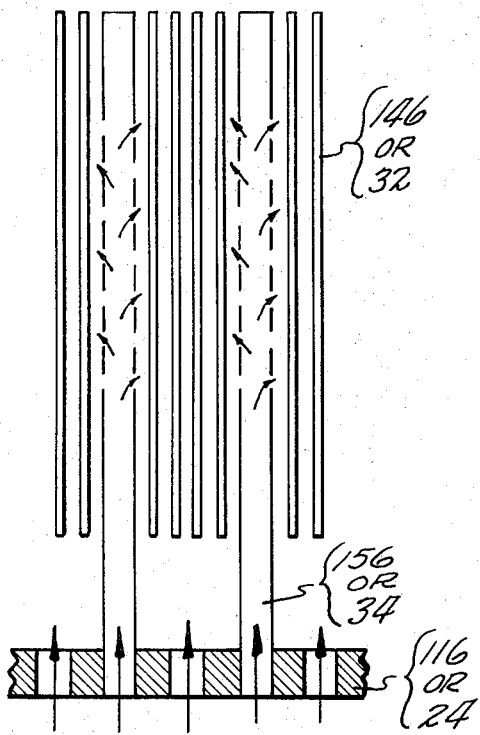
FIG. 19 is a diagrammatic representation illustrating how the cooler injection flow is introduced into the interior of the reactor.

The arrangement of this embodiment is particularly effective in that the region where it is desired to lower the enthalpy is the region disposed about the tubes 156 from which the water may be directed to effect this purpose. Moreover these tubes 156, occupying the space of four fuel rods, can provide adequate flow for this purpose with reasonable pressure drops. Thus with this embodiment, the bypassing of a portion of the coolant past an upstream portion of the core, where the thermal margin is more than adequate, by directing the coolant through the tubes 156 and then introducing it laterally from the tubes into the regions of high enthalpy rise, as best depicted in FIG. 19, is particularly effective and accomplishes the objective of lowering the thermal margin in the areas where it is most desirable to have it lowered and thereby increase the power generating capability of the reactor.

Figure 22:
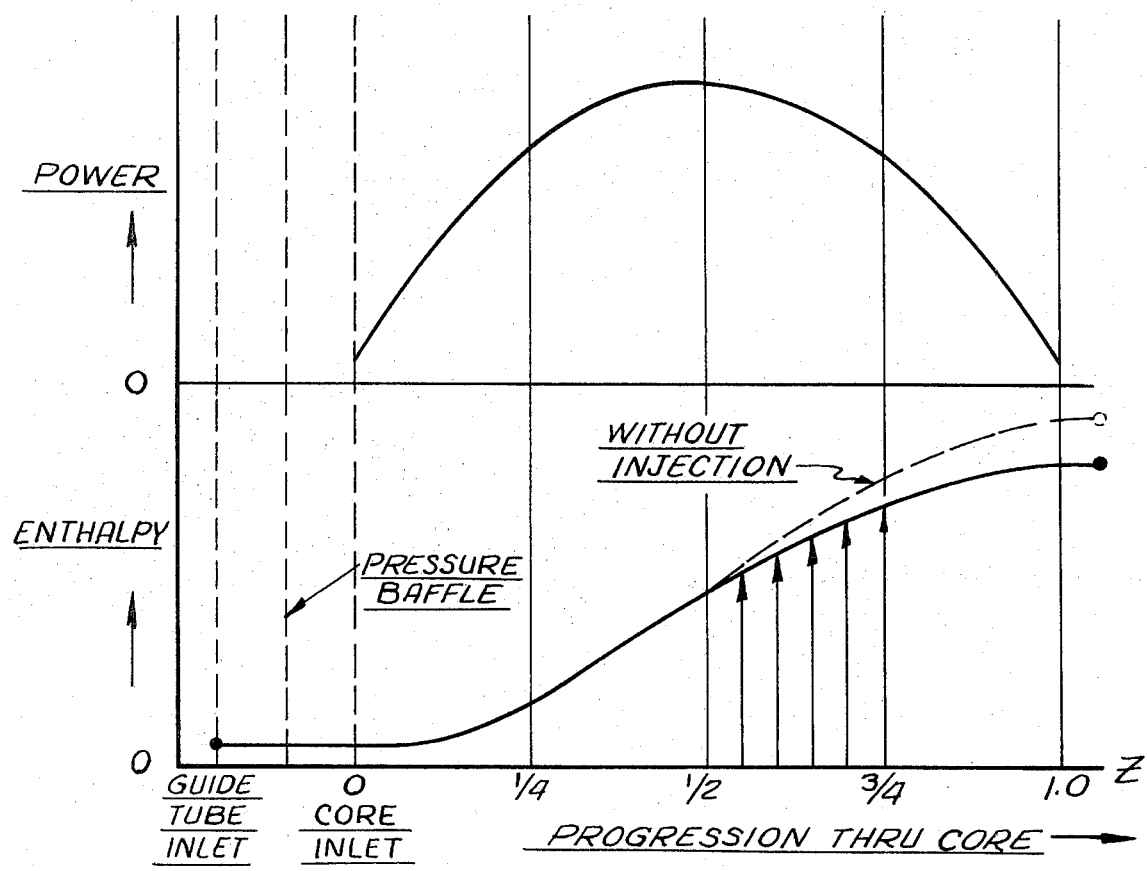

The graphic illustrations of FIGS. 21, 22 and 23 depict the variation in certain parameters with relation to progression of the fluid through the core. In the arrangement depicted in these curves fluid is injected laterally from the tubes 156 from a location approximately half way up the tubes to three-quarters of the way up the tube. FIG. 21 shows the decrease in pressure head of the cooling fluid from a point immediately upstream of the plate 116 to the outlet of the core, i.e., above the hold-down plate 130. The two upper curves identified as "Guide Tube" show that the total pressure decreases and the static pressure decreases until the point where fluid injection commences and then the static pressure increases. It will be noted that the total pressure in the main core flow drops in passing through the plate 116 identified as a "Pressure Drop Baffle" in the curve and drops slightly at the core inlet, i.e., at the plate 148 and then continues to gradually drop as it passes up through the core.

FIG. 22 discloses how the enthalpy is decreased by means of the injection of cooler water from the interior of tubes 156 into the hotter or high enthalpy fluid surrounding these tubes and passing over the fuel tubes disposed thereabout. In FIG. 23 the upper curve, i.e., the upper straight line, represents the total flow through the core. The next lower curve represents the main core flow, and it shows how this increases where fluid is injected thereinto from the tubes 156. There is a slight difference between the total flow and the final main core flow as a result of leakage from the top of the tubes 156. The lower curve shows the guide tube flow and how this decreases as the water is introduced into the main core flow.

Figure 17:
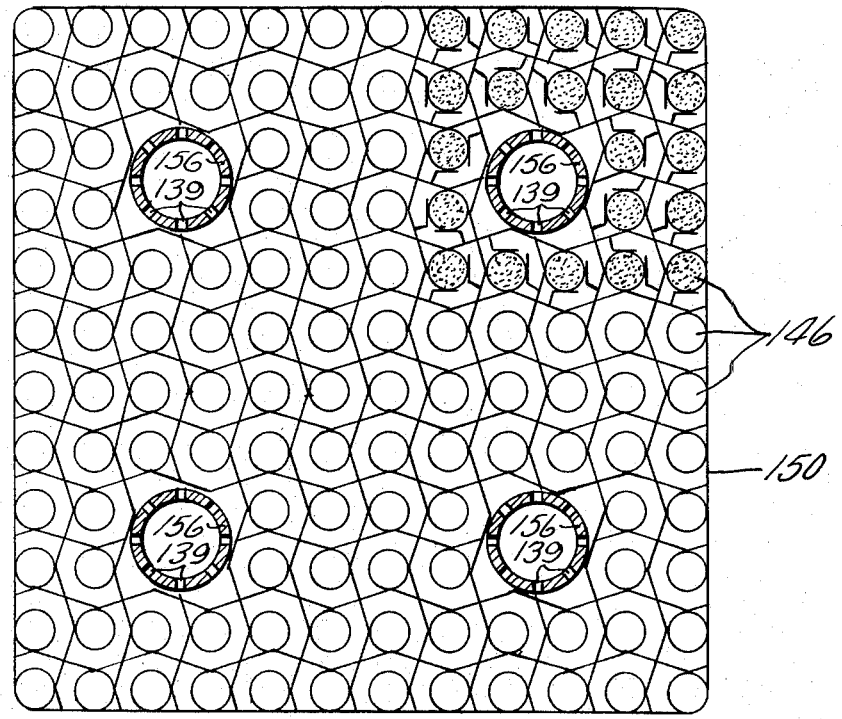
FIG. 17 is a sectional view in the nature of that of FIG. 13 but showing a different geometry for the fuel assembly.

In FIG. 17 there is shown a variation in the configuration of the assembly with relation to that of FIG. 8. In this FIG. 17 arrangement there is what is termed a 12 × 12 assembly wherein there are 12 fuel tubes on each side of the assembly, and in lieu of having five guide tubes 156, there are only four with these tubes being spaced inward two rows of fuel tubes in both directions, thus occupying the third and fourth lattice positions or zones inwardly from the two adjacent sides of the fuel assemblies. This arrangement actually provides a somewhat better maximum-to-average core distribution throughout the transverse area of the reactor core; however, because of the fewer number of tubes, there is an increase in the number of assemblies required, and in large power reactors this may undesirably increase the cost.

While two particular arrangements have been described wherein the organization and method of the invention are applicable to improving the thermal margin and, accordingly, increasing the power generating capability, the invention is applicable to any core construction which has regions of higher power density than other regions. This will be true in any coolant moderated reactors utilizing movable control members which move into and out of the core and which when removed, leave a volume that is occupied by moderator so as to provide a greater moderating capacity at a particular region than in other regions of the core.

Figure 20:
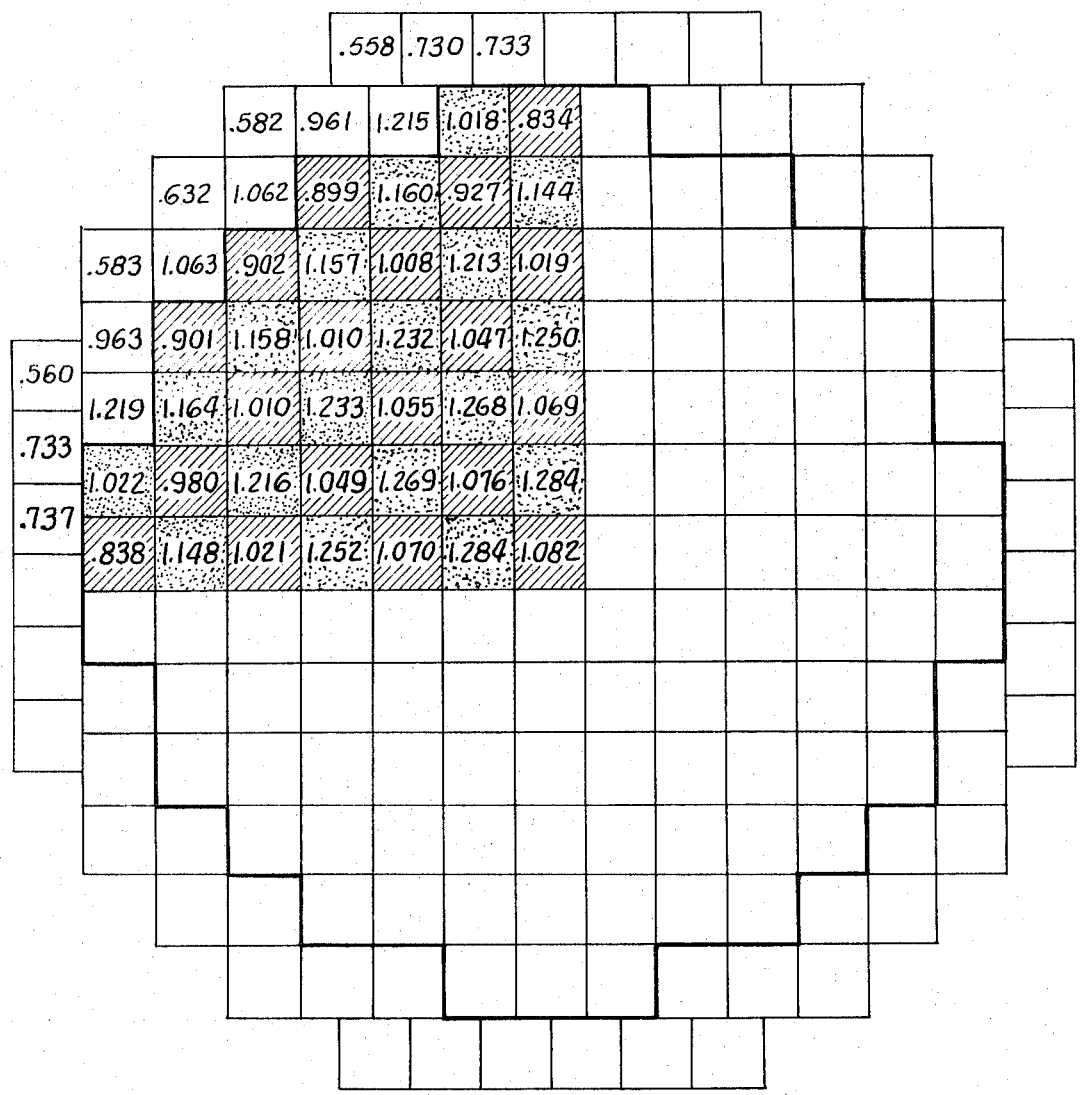
FIG. 20 is in the nature of the diagrammatic plan view of the reactor core with there being represented in approximately one-fourth of the fuel assemblies the ratio of the assembly power average to core power average showing that some of the assemblies operate at a higher power than others, or in other words some assemblies are hotter than others during operation.

In addition to improving the thermal margin in the particular locations where it would otherwise approach the limiting value, there is provided with the present invention a management of the gross flow of the reactor to provide a distribution of this flow in a manner which further increases the power generation capability of the reactor. Referring to FIG. 20 it will be seen that the average power of any particular assembly may be more or less than the average of the entire core. The figures in the boxes depicted in this figure indicate the average power of the assembly with relation to the average power of the core. A figure 1.0000 indicates that the assembly has the same average power as the core. The assemblies with a low ratio operate at a lower power density and, accordingly, a lower temperature than those with a high ratio. It is of advantage to be able to manage the gross flow of coolant through the core in a manner that the hotter assemblies have a greater flow associated with them than the cooler assemblies. With the invention this is obtained by means of orificing the inlets of the tubes 34 and 156 or more correctly the inlets of the nipples 127 which control the flow through the tubes 34 and 156. For example, there may be three orifice sizes. For an assembly-to-core power ratio of 0.500 to 0.8500 there may be an orifice which substantially stops the flow through the tubes 156. In the ratio range of 0.85 to 1.05 there may be an orifice which provides for a medium amount of flow while with the assemblies having a ratio above 1.05 the orifice may be eliminated completely or a large size orifice may be used to provide for substantially full flow. Illustrative of the flow control that may be considered, the total flow through the flow tubes 34 or 156 may be 15 per cent of the total flow passing out of the upper end of the reactor core. The control may be such that in the regions where the inlet orifice substantially stops the flow, the flow through that region of the core may be in the neighborhood of 13 per cent less than the average core flow; in the region wherein a medium sized orifice is used the flow may be average while in the region where a large size or no orifice is used, the flow may be 15 per cent greater than average. Thus gross flow management may be provided in a core which is entirely open, and by this is meant that the fuel assemblies are not contained within shrouds or boxes but rather have completely open sides so as to provide for better coolant mixing within the core and to eliminate the expense and neutron absorption occassioned by such boxing. Furthermore, not only is it possible to regulate the flow from one assembly to another, but it is possible to regulate the flow from one portion of an assembly to another portion of the same assembly. It may be found that within particular assemblies it is desirable to have a greater flow in one or more of the tubes than in others and such regulation is within the purview of the invention.

It is noted that FIG. 20 discloses a reactor core utilizing a three-zone fuel shuffling scheme. The fuel assemblies in the outer region of the core, those not cross-hatched or stipled in the upper left hand quadrant, are placed in the reactor as fresh fuel during refueling. The assemblies identified by stipling have been moved from this outer region and thus have been in the core for one refueling period. The assemblies identified by cross-hatching have been removed from the locations identified by stipling into these cross-hatched locations and thus have been in the reactor for two refueling periods. Thus both the cross-hatched and stipled assemblies identify assemblies wherein the fuel is partially depleted and this is one of the reasons for the particular value of the average assembly power to the average core power.

While we have illustrated and described a preferred embodiment of our invention it is to be understood that such is merely illustrative and not restrictive and that variations and modifications may be made therein without departing from the spirit and scope of the invention. We therefore do not wish to be limited to the precise details set forth but desire to avail ourselves of such changes as fall within the purview of our invention.

What we claim is:

1. A nuclear reactor cooled by a moderating fluid comprising a plurality of longitudinally extending fuel element assemblies comprising the reactor core, one end of said fuel element assemblies in said core constituting a fluid inlet end, each of said fuel element assemblies having a predetermined cross section and having a plurality of longitudinally extending fuel elements therein, said fuel elements arranged in said fuel element assemblies in a regular predetermined lattice array with each fuel element occupying one lattice position, said fuel element assemblies further including a plurality of guide tubes extending longitudinally through said fuel element assemblies, the cross sectional area of said guide tubes being at least equivalent to the portion of the cross sectional area of said fuel element assemblies occupied by two of said fuel elements, and thus occupying portions of at least two lattice positions, said guide tubes having an open end communicating with said fluid inlet end and having lateral openings therethrough spaced well from said fluid inlet end whereby cooler fluid from said fluid inlet end may be conducted through said guide tubes past a first portion of the core and introduced through said openings into desired other portions of the core, flow restricting means of a first size in at least some of said guide tubes and flow restricting means of a second size in others of said guide tubes, said flow restricting means located at the fluid inlet end of said guide tubes whereby the amount of fluid flow through different guide tubes varies, and control elements comprising fingers each having a cross sectional area only slightly smaller than the cross sectional area of said guide tubes, said control element fingers adapted to fit into selected ones of said guide tubes and mounted so as to be movable longitudinally therein.

* * * * *